May 7, 1957 D. E. ALLARD 2,791,443
TRACTOR-TRAILER HITCHING MECHANISM WITH COLLAPSIBLE GUIDE MEANS
Filed Feb. 14, 1955 2 Sheets-Sheet 1
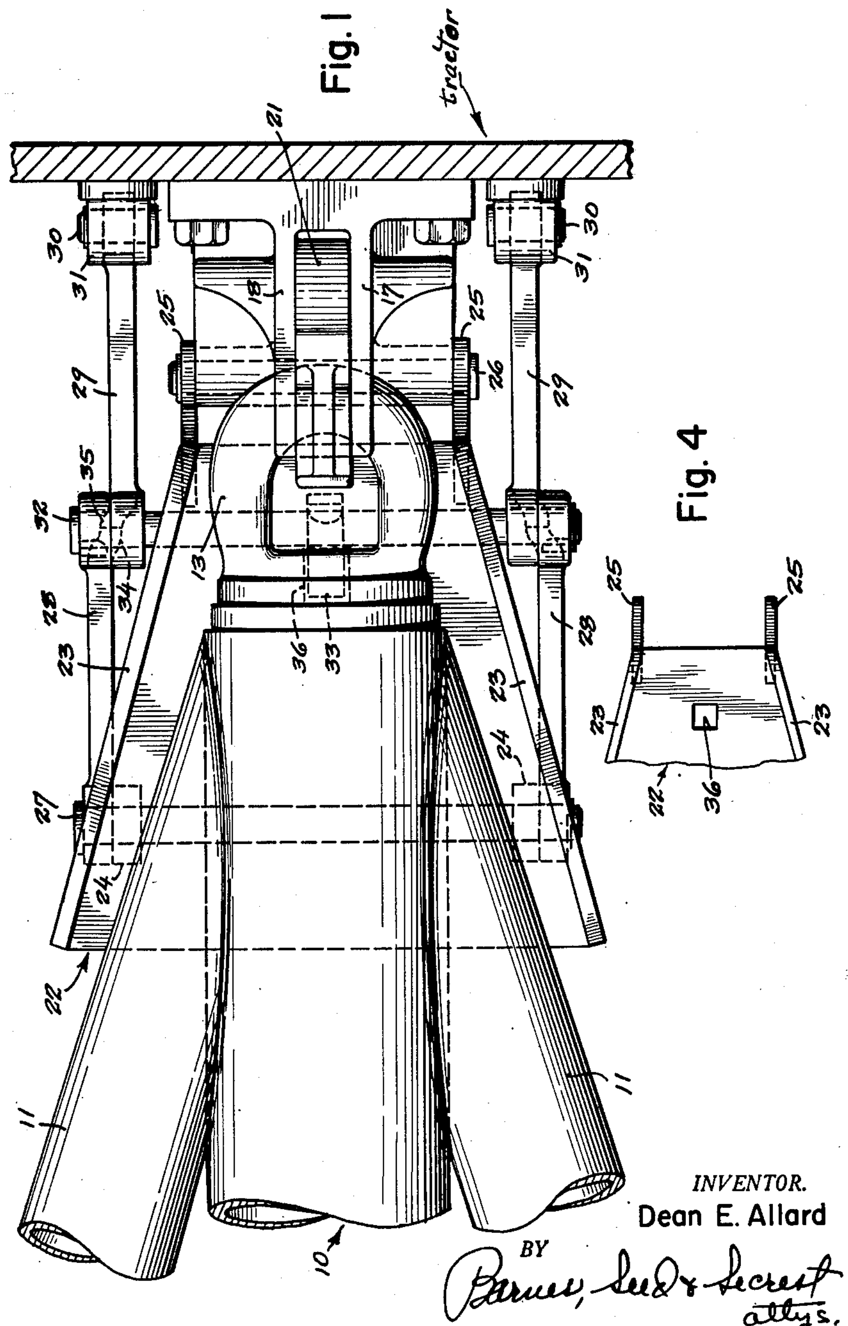
INVENTOR.
Dean E. Allard
BY
Barnes, Seed & Secrest
attys.

May 7, 1957 D. E. ALLARD 2,791,443
TRACTOR-TRAILER HITCHING MECHANISM WITH COLLAPSIBLE GUIDE MEANS
Filed Feb. 14, 1955 2 Sheets-Sheet 2
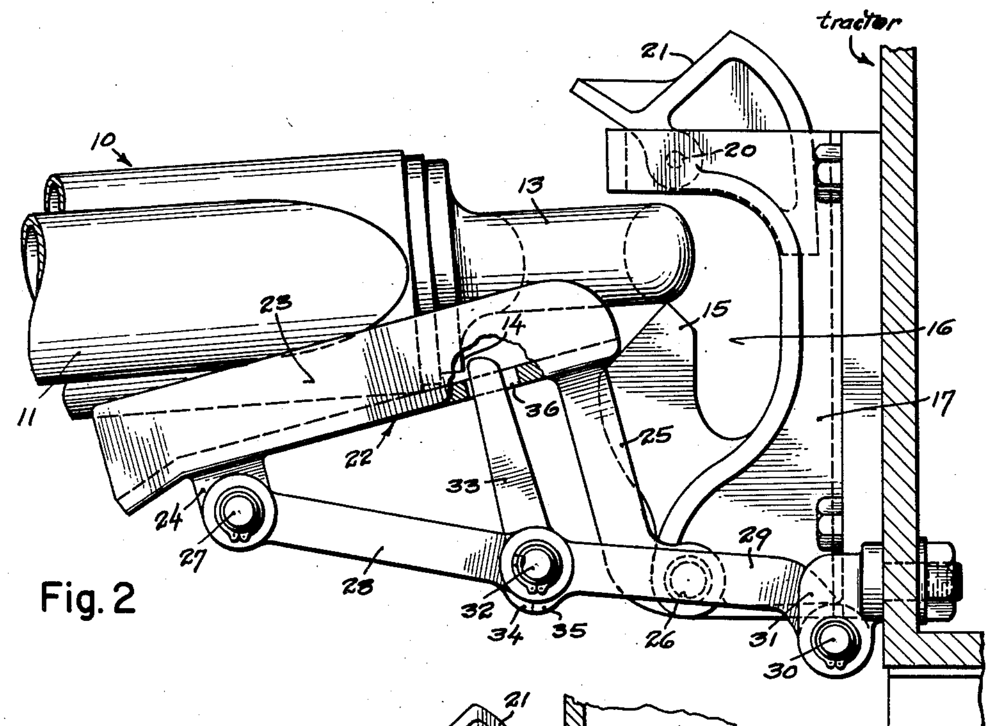
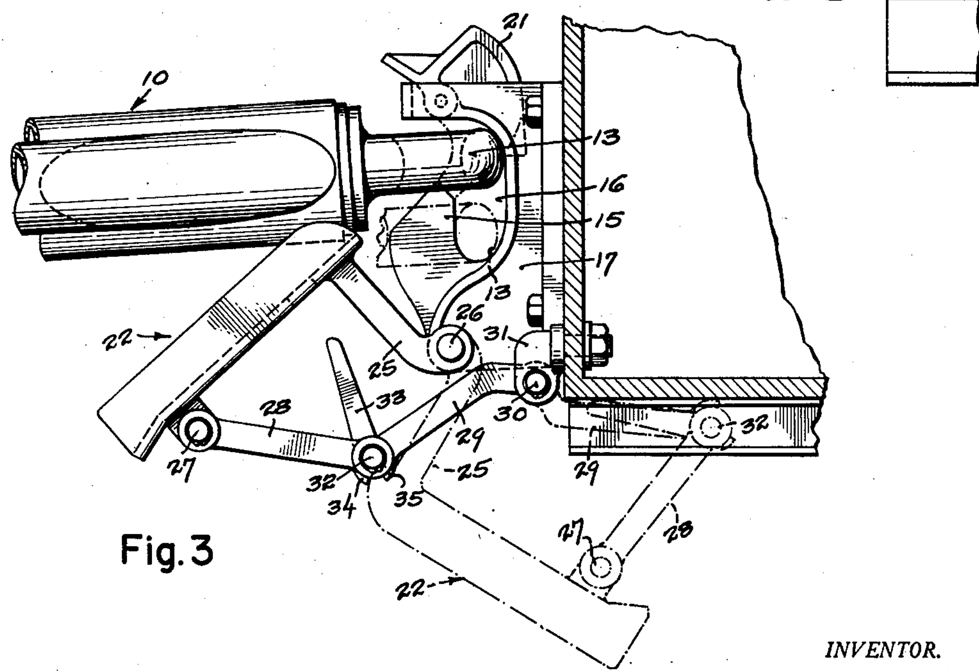
INVENTOR.
Dean E. Allard
BY
Barnes, Seed & Secrest
attys.

United States Patent Office 2,791,443

Patented May 7, 1957

2,791,443

TRACTOR-TRAILER HITCHING MECHANISM WITH COLLAPSIBLE GUIDE MEANS

Dean E. Allard, Seattle, Wash.

Application February 14, 1955, Serial No. 487,979

4 Claims. (Cl. 280—477)

This invention relates to hitch mechanism for connecting a tractor to a trailer and has particular reference to hitch mechanism for that type of tractor which has a fitting to which a trailer-carried tongue is connected.

In tractor-trailer hitches of the type to which the present invention pertains the trailer-carried tongue is swingable about a transverse horizontal axis and upon its front end provides a terminal eye whose axis is disposed vertically. As the functioning complement of this eye the tractor carries upon its rear end a hitch fitting which presents an upstanding spur or bill over which the eye is adapted to be hooked, and there is provided above this bill an access throat through which the eye is fed as a step incident to dropping the eye over the bill. In establishing a connection between the tractor-carried bill and the eye of the swingably mounted tongue it is the usual practice for a driver to slowly back his tractor toward the trailer while a helper lifts the tongue and guides the eye into the access throat of the hitch fitting. The operation thus calls for two men.

It is the general object of the present invention to provide, for a hitch of the nature described, hitch mechanism characterized in that the operation of coupling the tractor to the trailer can be performed by the driver alone.

Other more particular objects and advantages will appear and be understood in the course of the following description and claims, the invention consisting in the novel construction and in the adaptation and combination of parts hereinafter described and claimed.

In the accompany drawings:

Figure 1 is a fragmentary top plan view of a tractor-trailer combine having a hook-and-eye hitch with which there is incorporated a hitching mechanism made in accordance with the preferred teachings of the present invention, the parts being shown in position preparatory to coupling the eye of the hook.

Fig. 2 is a side elevational view thereof, also fragmentary, and with parts broken away and shown in section.

Fig. 3 is a side elevational view drawn to a reduced scale, with a folding apron over which the eye is guidably fed to the hook shown in course of dropping into an out-of-the-way position after registration has been established between the eye and the hook. Dotted lines in this figure portray the apron in its fully retracted position; and Fig. 4 is a reduced-scale fragmentary top plan view of said apron.

Referring to said drawings the numeral 10 denotes a tongue of the type to which the present invention pertains, and namely a swingably mounted tongue extending forwardly from the trailer and which is or may be provided with diagonal bracing arms 11. An eye-forming loop 13 projects forwardly beyond the tongue proper, and at the juncture of the tongue and eye there is usually provided a forwardly facing shoulder 14.

The hook fitting which is carried by the tractor as a complement of said tongue has an upstanding bill 15 over which said loop is arranged to be hooked, and presents a throat 16 of an inverted L-shape in side elevation through which said loop is fed in course of establishing said hooking engagement. Defining said throat is a stock composed of two laterally spaced cheek-plates 17 and 18, and received between said plates and pivoted thereto, as at 20, is a guard or mousing 21 for releasably locking the eye against disengagement from the hook. The parts hereinabove described are or may be standard.

According to the present invention there is provided a ramp over which the front end of the tongue is arranged to ride so as to guide the loop into the horizontal mouth of the throat 16, and producing this ramp is a rearwardly flared apron 22 having retaining walls 23 along each side. At the rear end of the apron at each sidé thereof there is provided a pendant apertured ear 24, and at the front end of the tray at each side thereof there is provided a pendant leg 25. Such legs each have their lower ends pivoted by a pin 26 to the stock of the hook-fitting at the substantial base of the hook, and there is attached by a pin 27 to each of the ears 24 one end of a respective pair of toggle arms 28—29 having their other end pivoted, as at 30, to a forked fitting 31 rigidly secured to the tractor. The pin 32 which produces the joint between the two toggle arms is keyed or otherwise fixed to one of the arms, here shown as the outer arm 28, and centrally or approximately centrally of the length of said pin there is secured thereto a lever 33. When the toggle arms are moved from the normal folded condition shown by broken lines in Fig. 3 into the extended strut-forming condition in which they are shown by full lines in Fig. 2, this lever occupies an erect position and protrudes by its upper end through an opening 36 in the floor of the ramp-forming tray. This said extended condition of the toggle arms is one which passes the pin 32 slightly above center so that vertical loads to which the ramp is subjected pass into the toggle arms a force potential influencing the pin 32 upwardly. Stop-lugs 34 and 35 provided by the two toggle arms limit the degree to which said pin can move beyond center.

In the use of the present hitch the tractor is backed within hitching distance, which is any position in which the eye lies within approximately 10" of the hooking bill 15. The operator then lifts the apron, with the tongue resting on the lip thereof, into the toggle-lock position. The truck is now again backed toward the trailer, causing the tongue to ride up the slope of the ramp until the loop enters the mouth of the throat and brings the eye into registration with the bill. Coincident therewith the shoulder 14 is brought into engagement with the lever 33, depressing the latter with a responsive folding collapse of the toggle arms and this permits the apron to give way so that the eye drops and hooks the tongue to the bill. The guard 21 is then manually swung into its "mousing" position. In lieu of having said strut automatically folded by engagement of the tongue with the lever 33 the toggle arms may, if desired, be collapsed manually. For this purpose the lever 33 may be deleted and a trip lever like or similar thereto is fixed to the outer end of the pin 32 so as to be exposed for activation by the operator.

It is thought that the invention and the manner of its operation will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. Hitching mechanism for a tractor and trailer combination in which the trailer has a tongue at its front end and in which the tractor provides means mating with means provided upon the front end of the tongue for coupling the tractor to the trailer, said mechanism comprising an apron hingedly carried by the tractor for vertical swinging movement from a lowered inactive position into a raised operating position whereat the apron sustains the front end of the tongue and guides the latter for endwise motion into a position whereat engagement is established as between said mating means and toggle arms connected at one end to the tractor and at the other end to the outer end of the apron and acting when extended to produce a stiff-leg propping up the outer end of the apron, the toggle joint of said toggle arms being caused in said extension movement to pass through and moderately beyond center so as to lock the toggle-arms in their apron-propping position, stop means being provided for limiting said travel past center.

2. Hitching mechanism for a tractor and trailer combination in which the trailer has a tongue at its front end provided with a terminal eye and in which the tractor provides bill means mating with the terminal eye means provided upon the front end of the tongue for coupling the tractor to the trailer, said mechanism comprising an apron hingedly carried by the tractor for vertical swinging movement from a lowered inactive position into a raised operating position whereat the apron sustains the front end of the tongue and guides the latter for endwise motion into a position whereat engagement is established as between said mating means, a retractable leg acting when extended to prop the apron in said raised position, and means operating to retract said prop automatically as the eye of the tongue is brought into said engaging position with the bill, said tongue providing a forwardly facing shoulder at the approximate juncture of the tongue with its terminal eye, the retracting means comprising a trip lever operatively interconnected with the prop and engaged by said shoulder.

3. Hitching mechanism for a tractor and trailer combination in which the trailer has a tongue at its front end and in which the tractor provides means mating with means provided upon the front end of the tongue for coupling the tractor to the trailer, said mechanism comprising an apron hingedly carried by the tractor for vertical swinging movement from a lowered inactive position into a raised operating position whereat the apron sustains the front end of the tongue and guides the latter for endwise motion into a position whereat engagement is established as between said mating means, and toggle arms connected at one end to the tractor and at the other end to the apron and acting when extended to produce a stiff-leg propping up the apron, the toggle joint of said toggle arms being caused in said extension movement to pass through and moderately beyond center so as to lock the toggle-arms in their apron-propping position.

4. Hitching mechanism for a tractor and trailer combination in which the trailer has a tongue at its front end provided with a terminal eye and in which the tractor has an upstanding bill over which said eye is adapted to be hooked, said mechanism being carried by the tractor and comprising an apron hingedly mounted for vertical swinging movement from a lowered inactive position into a raised operating position whereat the same sustains the front end of the tongue and guides the eye into a position registering with the bill, a retractable leg acting when extended to prop the outer end of the apron in said raised position, and means operating to retract said prop automatically as the eye of the tongue is brought into said position registering with the bill, said propping leg being comprised of two toggle arms so arranged that, when the leg is extended, the joint between the arms passes through and moderately beyond center to lock the leg in its apron-propping position.

References Cited in the file of this patent

FOREIGN PATENTS

| | | |
|---|---|---|
| 485,240 | Germany | Oct. 28, 1929 |
| 693,134 | Germany | July 3, 1940 |